United States Patent
Chandler et al.

(10) Patent No.: US 12,481,840 B2
(45) Date of Patent: Nov. 25, 2025

(54) TRANSLATING DOCUMENTS USING NEURAL NETWORKS AND HIERARCHICAL STRUCTURING OF DOCUMENTS

(71) Applicant: AVODAH, INC., Wilmington, DE (US)

(72) Inventors: Trevor Chandler, Thornton, CO (US); Dallas Nash

(*) Notice: Subject to any disclaimer, the term of this patent is extended or adjusted under 35 U.S.C. 154(b) by 221 days.

(21) Appl. No.: 18/296,921

(22) Filed: Apr. 6, 2023

(65) Prior Publication Data

US 2023/0325609 A1     Oct. 12, 2023

Related U.S. Application Data

(60) Provisional application No. 63/362,589, filed on Apr. 6, 2022.

(51) Int. Cl.
| | |
|---|---|
| *G06F 40/42* | (2020.01) |
| *G06F 40/253* | (2020.01) |
| *G06F 40/30* | (2020.01) |
| *G06F 40/47* | (2020.01) |
| *G06N 3/08* | (2023.01) |

(52) U.S. Cl.
CPC ............ *G06F 40/42* (2020.01); *G06F 40/253* (2020.01); *G06F 40/30* (2020.01); *G06F 40/47* (2020.01); *G06N 3/08* (2013.01)

(58) Field of Classification Search
CPC .......... G06F 40/42; G06F 40/44; G06F 40/45; G06F 40/55

See application file for complete search history.

(56) References Cited

U.S. PATENT DOCUMENTS

| | | | | |
|---|---|---|---|---|
| 8,214,196 | B2* | 7/2012 | Yamada | G06F 40/44 704/9 |
| 8,554,538 | B2* | 10/2013 | Stuhec | G06F 40/289 704/9 |
| 9,183,197 | B2* | 11/2015 | Eden | G06F 40/42 |
| 9,330,087 | B2* | 5/2016 | El-Sharqwi | G06F 40/45 |

(Continued)

OTHER PUBLICATIONS

Zaninello, Andrea and Alexandra Birch, "Multiword Expression aware Neural Machine Translation," Proceedings of the 12th Conference on Language Resources and Evaluation 2020, Marseille May 11-16, 2020, copyright European Language Resources Association, pp. 3816-3825/.

(Continued)

*Primary Examiner* — Douglas Godbold
(74) *Attorney, Agent, or Firm* — Perkins Coie LLP

(57) ABSTRACT

Disclosed are methods, devices and systems for translating a document using neural networks and leveraging the hierarchical structure of the document. Embodiments of the disclosed technology use bi-level structures that incorporate both the unique meanings of words and unique grammatical rules on matching grammatical word types in a document to train a neural network. The trained neural network is used to translate documents in an automated and efficient manner. The disclosed embodiments advantageously use manual (or human) analysis on a small portion of text to identify the unique means and grammatical rules, which is then leveraged to translate a much larger corpus of text with increased reliability and accuracy.

20 Claims, 9 Drawing Sheets

(56) References Cited

U.S. PATENT DOCUMENTS

| | | | | |
|---|---|---|---|---|
| 11,663,468 B2* | 5/2023 | Chu | | G06N 3/045 706/18 |
| 2005/0091036 A1* | 4/2005 | Shackleton | | G06F 40/211 704/9 |
| 2009/0198488 A1* | 8/2009 | Vigen | | G06F 40/30 704/9 |
| 2009/0326911 A1* | 12/2009 | Menezes | | G06F 40/55 704/2 |
| 2010/0179803 A1* | 7/2010 | Sawaf | | G06F 40/40 704/E15.003 |
| 2011/0307244 A1* | 12/2011 | He | | G06F 40/45 704/4 |
| 2016/0132484 A1* | 5/2016 | Nauze | | G06F 40/268 704/9 |
| 2016/0267078 A1* | 9/2016 | Morehead | | G06F 40/42 |
| 2018/0129972 A1* | 5/2018 | Chen | | G06N 3/045 |
| 2018/0300317 A1* | 10/2018 | Bradbury | | G06N 3/08 |
| 2020/0193085 A1* | 6/2020 | Tanaka | | G06F 40/106 |
| 2021/0064828 A1* | 3/2021 | Johnson Premkumar | | G10L 15/063 |
| 2023/0124168 A1 | 4/2023 | Malkiel et al. | | |
| 2023/0132090 A1 | 4/2023 | Yao et al. | | |
| 2023/0267285 A1* | 8/2023 | Wu | | G06F 40/166 704/2 |
| 2024/0153299 A1* | 5/2024 | Pillai | | G06V 30/41 |

OTHER PUBLICATIONS

Dinh, Dian, "Building a training corpus for word sense disambiguation in English-to-Vietnamese Machine Translation," published Sep. 1, 2002, COLING-MTIA '02: Proceedings of the 2002 COLING workshop on Machine translation in Asia, vol. 16, pp. 1-7.

* cited by examiner

- Words

- Grammar

- Words

- Grammar

FIG. 4A

TRANSLATING DOCUMENTS USING NEURAL NETWORKS AND HIERARCHICAL STRUCTURING OF DOCUMENTS

CROSS-REFERENCE TO RELATED APPLICATION

This application claims priority to and benefits from U.S. Provisional Patent Application No. 63/362,589, filed on Apr. 6, 2022, the disclosure of which is hereby incorporated by reference herein in its entirety.

TECHNICAL FIELD

The present document is generally related to computerized systems for document translation, and more specifically, to configuring multiple neural networks to translate a document with a hierarchical structure from a source language to a destination language.

BACKGROUND

Machine translation is a sub-field of computational linguistics that investigates the use of software to translate text or speech from one language to another. In an example, machine translation performs mechanical substitution of words in one language for words in another, but that alone rarely produces a good translation because recognition of whole phrases and their closest counterparts in the target language is needed. Not all words in one language have equivalent words in another language, and many words have more than one meaning. Solving this problem with statistical and neural techniques is a rapidly growing field that is leading to better translations, handling differences in linguistic typology, translation of idioms, and the like.

Improved output quality can also be achieved by human intervention: for example, some systems are able to translate more accurately if the user has unambiguously identified which words in the text includes proper names. With the assistance of these techniques, machine translation has proven useful as a tool to assist human translators.

SUMMARY

Translating documents typically requires accurately producing words, which have the correct meanings, in order to perform an ordering and placement of the words to form natural sounding translated content. Embodiments of the disclosed technology advantageously enable the least amount of work (e.g., making the smallest set of changes to unique meanings and unique instances of grammar correction) to be done manually, and then output the requisite data needed (e.g., a mapping) to make a similar change to other portions of a document. This more extensive set of changes may be used to train neural networks, which can then make additional changes in other documents (e.g., based on the similarly between documents).

In one aspect, the described embodiments provide the automated hierarchical structuring of documents using bi-level structures for both unique meanings of words and unique grammatical rules on matching single, or sets of, matching grammatical word types in specific orders for efficiency in translation, augmentation of data, and training of corrective neural networks.

In another aspect, the described embodiments include a method for improving a translation of a first document in a source language to a second document in a destination language. The method includes generating a first plurality of hierarchical mappings for the source language and a second plurality of hierarchical mappings for the destination language. In this aspect, each of the first plurality of hierarchical mappings includes (a) a first mapping between a location of a word of a plurality of words in the source language and a grammatical information associated with the word, and (b) a second mapping between the grammatical information and a grammatical rule of the source language, where the grammatical information associated with the word comprises at least a meaning of the word and a grammatical word type of the word. The method further includes generating, based on the first plurality of hierarchical mappings and the second plurality of hierarchical mappings, one or more corrections for translating the first document to the second document, and training, based on the one or more corrections, a plurality of neural networks. Each of the plurality of neural networks is configured to identify and implement a corresponding correction, and the method further includes using at least the plurality of neural networks to translate a third document in the source language to a fourth document in the destination language.

In yet another aspect, an apparatus comprising a memory and a processor for implementing the above-described methods is disclosed.

In yet another aspect, the method may be embodied as processor-executable code and may be stored on a non-transitory computer-readable program medium.

The above and other aspects and features of the disclosed technology are described in greater detail in the drawings, the description and the claims.

BRIEF DESCRIPTION OF THE DRAWINGS

Drawings described herein are used to provide a further understanding and constitute a part of this application. Example embodiments and illustrations thereof are used to explain the technology rather than limiting its scope.

FIGS. 4A and 4B illustrate an example of a one-to-many mapping from a source language to a destination language.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Embodiments of the disclosed technology are directed to translating documents using neural networks and leveraging the hierarchical structure of documents. The translation uses minimal human intervention to identify hierarchical mappings of the words and grammar in the document, which is used to train one or more neural networks that are then used to improve the accuracy of the translation across the remainder of the document.

Figure 1:
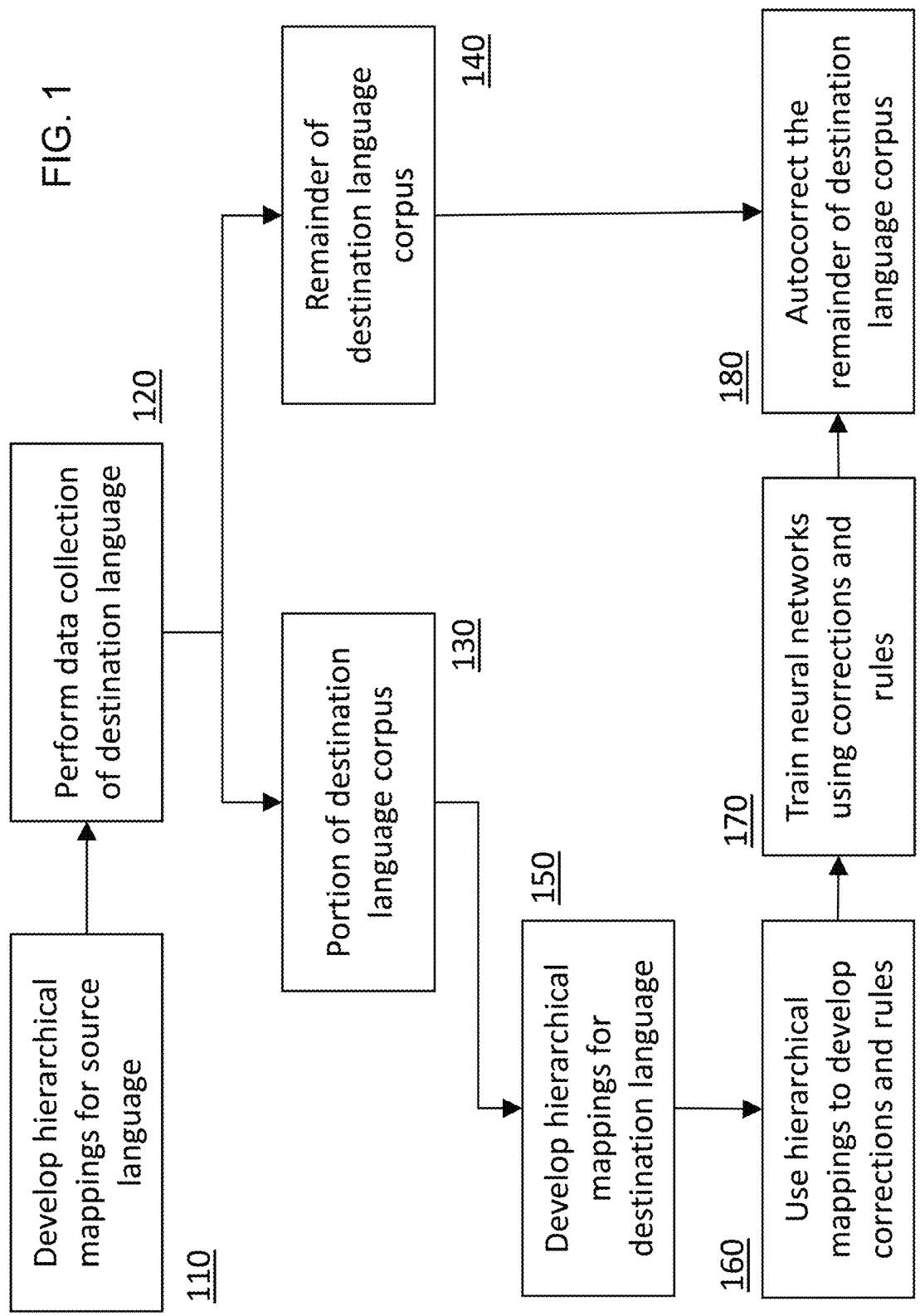
FIG. 1 is a flowchart illustrating an example method for translating a document from a source language to a destination language.

An example flowchart illustrating an example method 100 for document translation based on the described embodiments is shown in FIG. 1. As shown therein, the method 100 includes, at operation 110, developing (or generating) the hierarchical mappings for the source language. In some embodiments, the hierarchical mapping is generated based on a first document in the source language. In other embodiments, it may be generated based on a portion of the first document. In yet other embodiments, multiple documents in the source language may be available, and a first document is used to generate the hierarchical mappings.

The method includes, at operation 120, collecting data in the destination language. In some embodiments, the data collected may be used to generate one or more documents in the destination language. In some embodiments, a second document in the second language may be generated, and at operations 130 and 140, split into a first portion and a second portion, with the first portion being used to train the neural networks (e.g., operations 150-170) and the trained neural networks being used to translate the second portion (e.g., operation 180).

The method includes, at operation 150, generating hierarchical mappings for the destination language. In some embodiments, the hierarchical mappings for the destination language are generated using the second document (or portion of the second document). In other embodiments, they are generated based on responses to a series of questions asked to native speakers about the destination language. Then, the hierarchical mappings for the first and second languages are used to develop a set of rules and corrections that result in a more accurate translation (at operation 160). Multiple neural networks are trained using this set of rules and corrections (at operation 170), e.g., each of the multiple neural networks is trained using one of the rules or corrections, which it can then propagate through the remainder of the second document or subsequent documents (at operation 180).

Figure 2A:
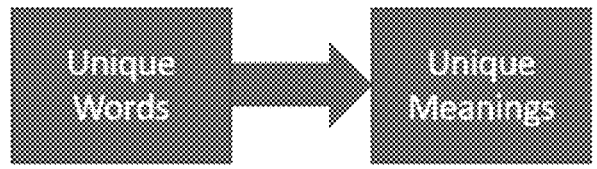
FIGS. 2A and 2B illustrate examples of hierarchical mappings.
Figure 2A:
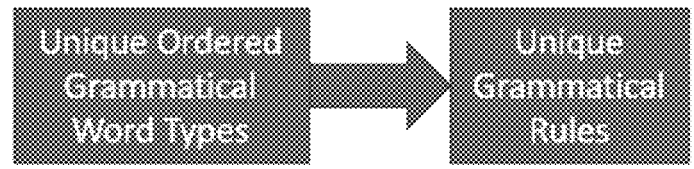
Figure 2B:
Figure 2B:
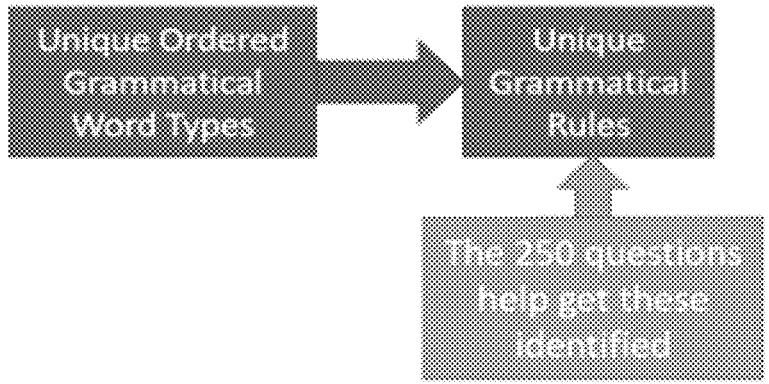

Examples of the hierarchical mappings that are used to train the neural network are shown in FIGS. 2A and 2B. FIG. 2A shows a first mapping from unique words to unique meanings and a second mapping from unique ordered grammatical word types to unique grammatical rules. These mappings are the means by which the document is structured. The locations of these mappings in the text are identified and persisted in a neural network, which can then enable the neural networks to be used for translating subsequent documents.

FIG. 2B shows another example of the first and second mappings that have been augmented with additional modules that increase the efficacy and accuracy of the system. In an example, the first mapping can be augmented using "word alignment" or topic modeling (e.g., an unsupervised approach of recognizing or extracting topics in a document by detecting the patterns using clustering algorithms, which divides the data into different parts, and results in patterns of word clusters and frequencies of words in the document). This is akin to using expert knowledge to verify that a specific document (or piece of text) has been translated accurately. In another example, the second mapping can be augmented using a set of grammatical rules in the destination language that have been developed independently of the neural networks and hierarchical mappings in the described embodiments. For example, independent grammatical rules may be developed by asking a series of questions to native speakers to generate these rules, e.g., the ILAD project has a list of 250 questions that have been selected to identify 90% of the grammatical rules of a particular language.

An example of the first type of mapping from a unique word to a unique meaning is "bank", which could refer to (1) a financial institution or (2) the point of highest elevation in a body of water. An example of the grammatical word types is "the (preposition) dog (noun) was (verb) brown (adjective)", wherein the word types are indicated in parentheses.

Figure 3:
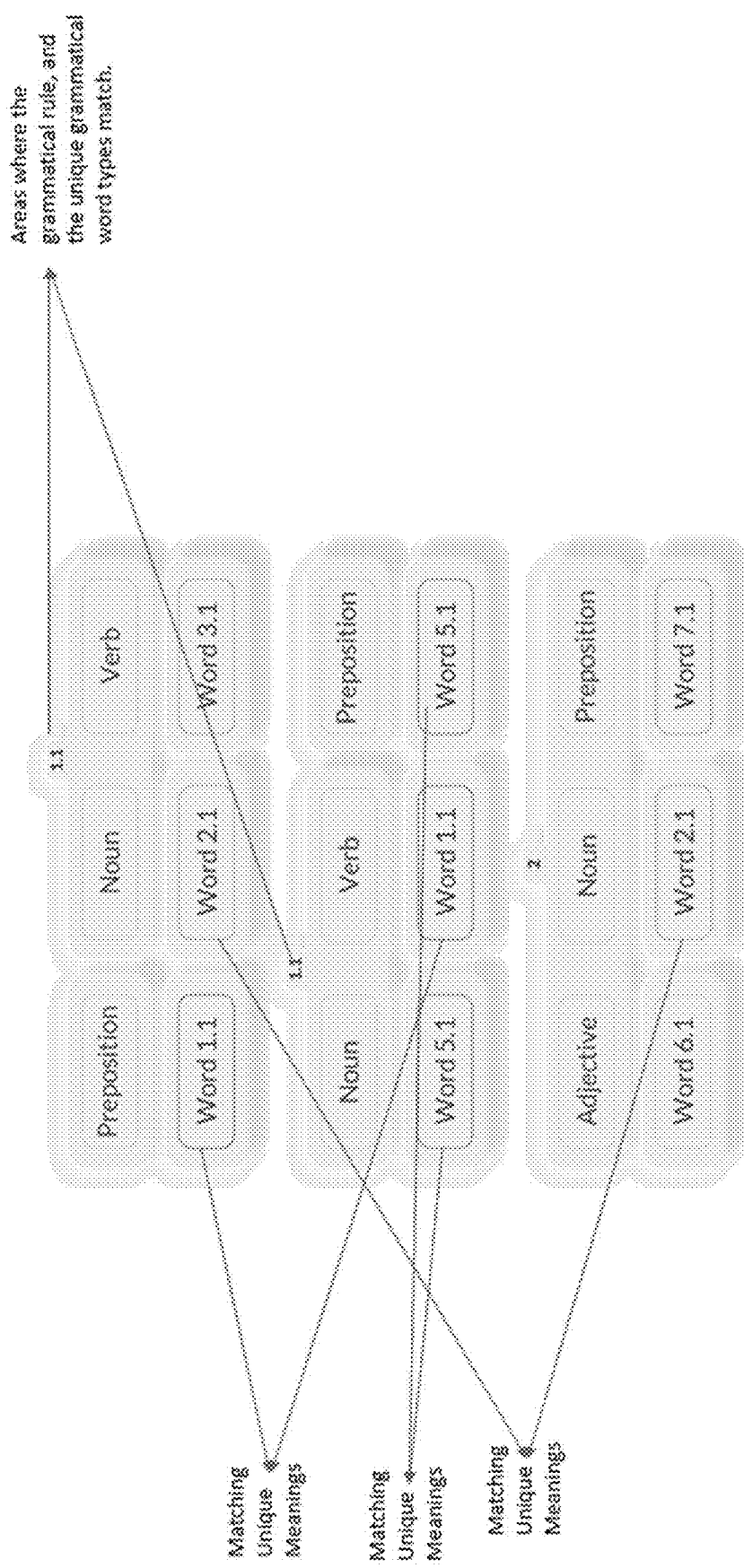
FIG. 3 illustrates an example of implementing a hierarchical mapping in a text.

FIG. 3 shows an example of how the hierarchical mappings in FIGS. 2A and 2B can be implemented in a document. As shown therein, the word type (e.g., preposition, noun, verb) of each word in a document can be identified and unique grammatical word type matches can be identified. In some embodiments, only a single instance of each unique combination needs to be reviewed and fixed, and then the same type of change can be rolled out to the matching unique hierarchies. As discussed above, the data related to what has changed can be used to train a neural network capable of making the same type of changes automatically. The described embodiments also provide data augmentation, which enables the generation of massive amounts of data that are required to train the neural networks.

In some embodiments, a rule would look and see if a particular number of changes had been corrected of a particular type where a greater than number of matching places that could benefit from the same fix also exist then make the changes which basically executes data augmentation and then train the neural network. Therefore, by using that rule, the system would automatically watch for opportunities to make all the fixes that were matching when a single fix was made and generate the data and create a neural network that could then be used to make the same kind of change automatically. This would advantageously enable the translation and correction of additional documents that met certain criteria for how similar they were.

Figure 4A:
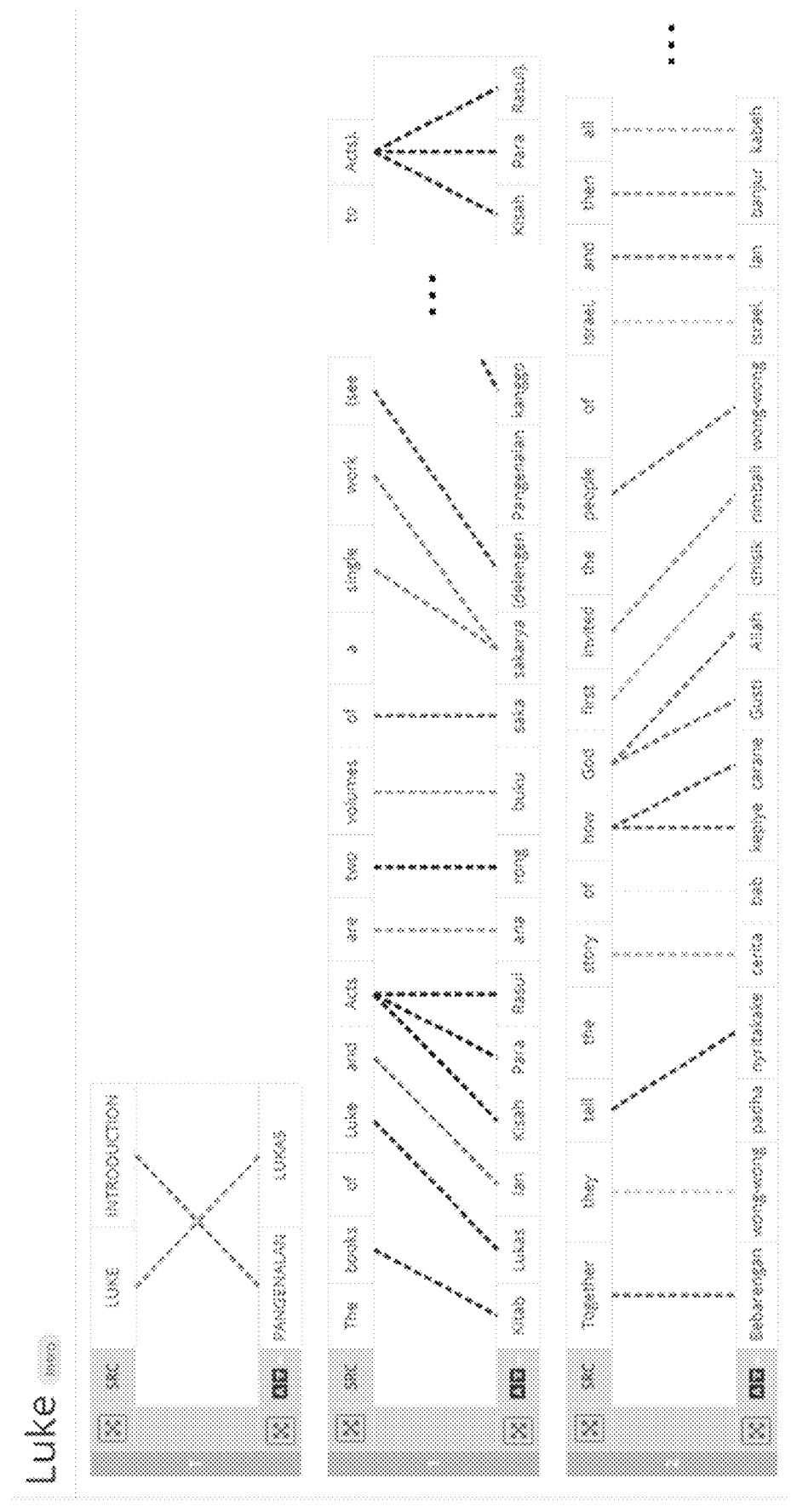
Figure 4B:
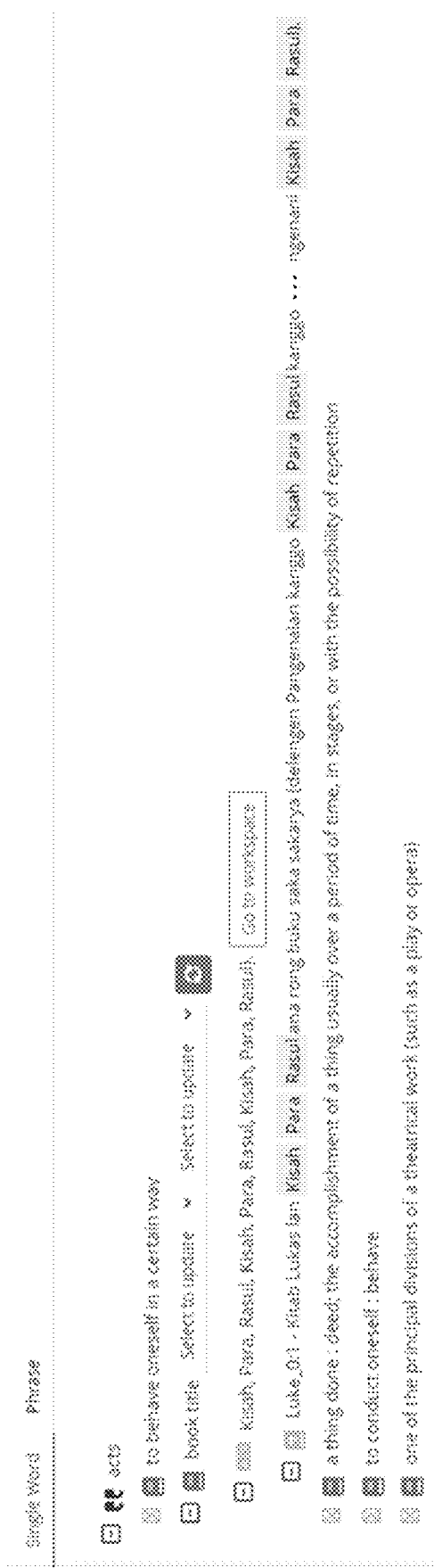

In some embodiments, a single word in a source language translates to a single word in the destination language (e.g., a one-to-one mapping). Alternatively, a single word in a source language translates to multiple words in the destination language (e.g., a one-to-many mapping) or multiple words in the source language can translate to a single word in the destination language (e.g., a many-to-one mapping). As shown in the example in FIG. 4A, in addition to single words in the source language ("books," "two" and "story") translating to a single word in the destination language ("Kitab," "rong" and "cerita," respectively, in Javanese), a single word in the source language ("Acts" and "how" in English) translates to multiple words in the destination language ("Kisah Para Rasul" and "kepiye carane," respectively, in Javanese) in some instances, whereas in other instances, multiple words in the source language ("single work" in English) translate to a single word in the destination language ("sakarya" in Javanese). The one-to-one, one-to-many, or many-to-one mappings are tagged as grammatical word types and provided unique meanings, which are then provided to one of the multiple neural networks, which can correctly identify and translate this instance throughout the document. Furthermore, these mappings are configured in the appropriate context. For example, and as shown in FIG. 4B, the word "Acts" (or "acts") can mean (1) to behave oneself in a certain way, (2) a book title, (3) a thing done, e.g., a deed, (4) to conduct oneself, e.g., behave, or (5) one of the principal divisions of a theatrical work. In this instance, the neural network configured to identify and translate "Acts" will train on the term corresponding to meaning (2) and would replace "Acts" with "Kisah Para Rasul" only in the correct context throughout the English document that is being translated into Javanese.

Figure 5:
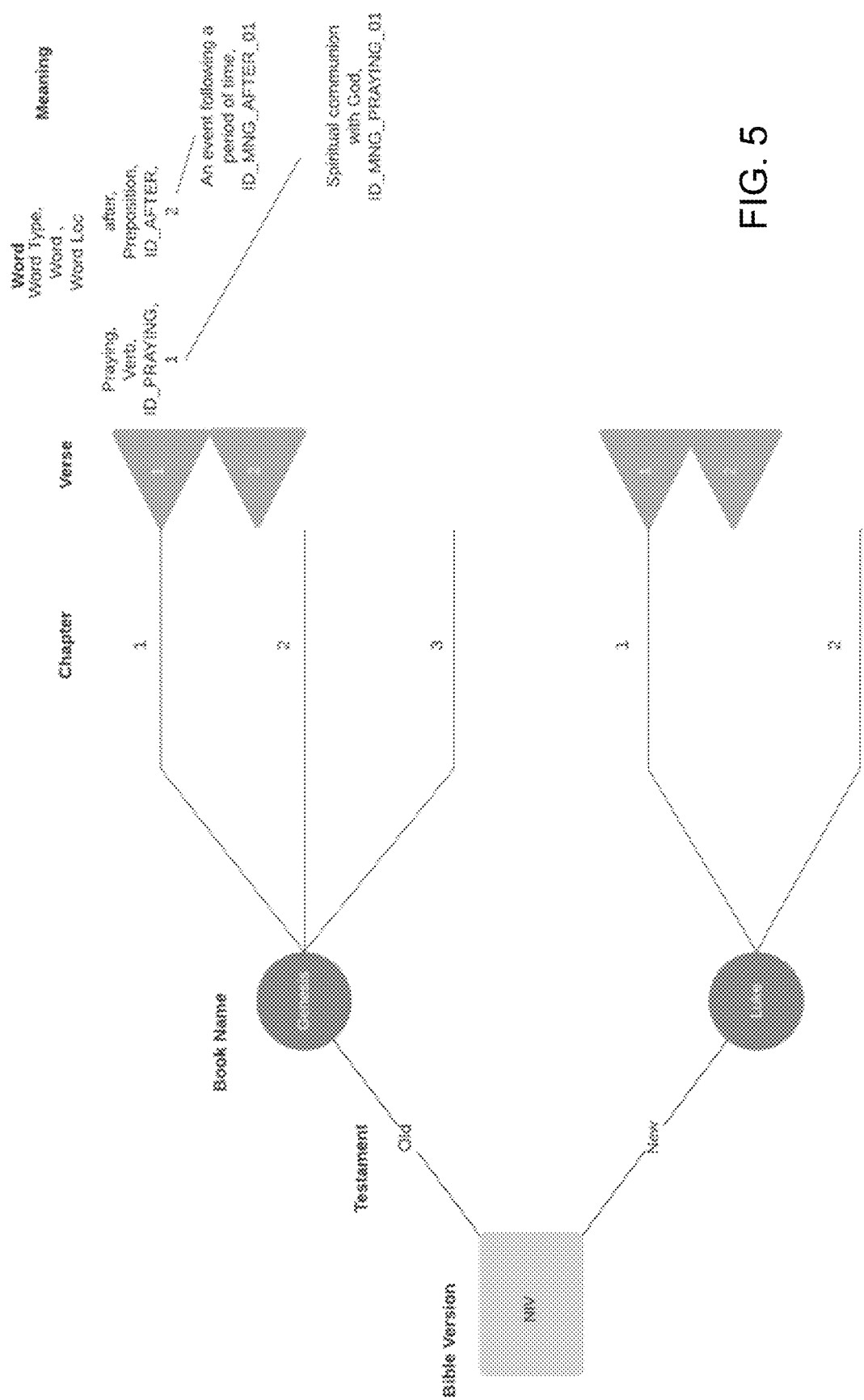
FIG. 5 illustrates an example of a hierarchical structure in the Bible.

The described embodiments can also leverage the hierarchical structure inherent in some documents. FIG. 5 shows an example of this hierarchical structure in the Bible, which illustrates the division of the NIV Bible into the Old Testament and the New Testament and their respective books, the books into chapters, the chapters into verses, the verses into word types (e.g., unique words and locations) and the different meanings of a word. Although the example in FIG. 5 has been described in the context of the Bible, it can be applied to any document with a hierarchical structure, e.g., a compendium of poetry.

This hierarchical structure forms the underpinnings, inter alia, of the described embodiments. For example, issues or corrections that are made between a particular book and one of its chapters can then be applied to the other chapters of the particular book, and even to all the chapters of another book (which may depend on the similarity between chapters and books, which is quantified using a scoring system in the example described in FIG. 6). The rules associated with the corrections can be configured to incorporate both the meaning and the associated grammatical rule. This ensures that a subsequent instance of the word is only replaced if it is present in the same context as defined in the rule.

For example, and referring to the example described earlier, the word "bank" would be replaced by the translation for a financial institution if the words surrounding it (e.g., in the same sentence, paragraph, or page) were more related to monetary principles instead of water and navigation. Training a single neural network to recognize and translate a single correction advantageously enables the described embodiments to focus on context recognition. Thus, using multiple neural networks for the translation results in an accurate translation from any source language to any destination language, even if the initial corpus (in either the source or destination language) is fairly limited.

Figure 6:
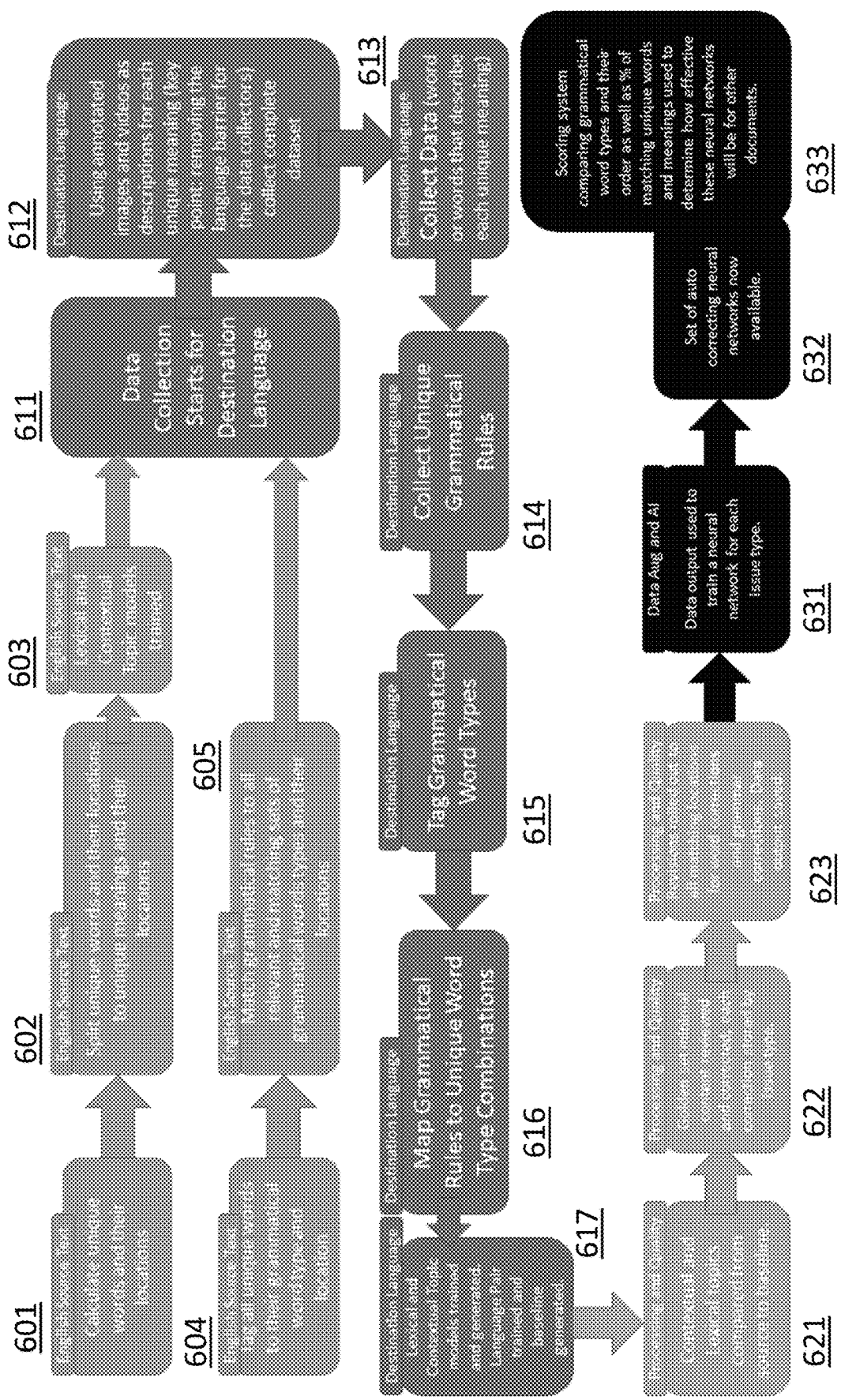
FIG. 6 is a workflow for translating a document.

FIG. 6 shows a workflow of an example embodiment described in this document. As shown therein, the workflow begins, in operations 601-605, with processing the text in a source language to generate hierarchical mappings (e.g., as described in FIGS. 2A and 2B), which then enables the training of lexical and contextual topic models. For example, at operation 601, the unique words and their locations are identified, which are then split into their unique meanings and their locations in operation 602. These unique words and meanings (and their respective locations) are used to train lexical and topic models in operation 603. In operation 604, all unique words (or multiple words in the case of many-to-one mappings, as shown in FIGS. 4A and 4B) are tagged to their grammatical word type and location. In operation 605, the grammatical rules are matched to all relevant and matching sets of grammatical word types and their locations.

The workflow then performs similar processing for the destination language in operations 611-617, which begins with the data collection, in operation 611, for the destination language. In operation 612, annotated images and videos are used as descriptions for each unique meaning to complete the dataset, thereby removing the language barrier for data collectors. The methodology in operations 613-617, which are similar to operations 601-605 for the source language, are applied to the destination language.

The hierarchical mappings and grammatical rules generated for the source language and the destination language are compared to generate a set of translation rules and corrections in operations 621-623, which are revised by applying them to a small corpus of text. In operations 631-633, the set of translation rules and corrections are used to train multiple neural networks (e.g., one neural network can be trained to identify and process a single issue or correction), which can be used to process documents in the source language. In some embodiments, statistics related to the efficacy of the neural network being used for translation are collected, which can then be used to predict how accurate the neural networks would be for certain types of documents.

In some embodiments, the scoring system described in FIG. 6 compares grammatical word types and their order, as well as the percentage of matching unique words and meanings. In other embodiments, topic modeling can be used as part of the scoring system. For example, cluster recognition algorithms can be employed to provide statistical information for the source document and the translated document in the destination language.

In some embodiments, the described scoring system is used in conjunction with the hierarchical structure of the source document to improve the efficiency and efficacy of the translation. For example, when the multiple neural networks are used to translate a particular chapter, the scoring system can be used to score both the chapter that was currently translated as well as other chapters. Only chapters with scores that exceeded a threshold would be processed by the existing multiple neural networks. Chapters with scores that were below the threshold (e.g., representing textual content that was different from the currently translated chapter) could be translated after the multiple neural networks were retrained or their internal weights were adjusted to better align with the different textual content.

In some examples, a single threshold is used to determine whether a chapter (or any hierarchical portion of the document) is similar to another chapter (or portion). In other example, multiple thresholds can be used to determine a how much retraining or weight adjustment was needed for the multiple neural networks before they were used to translate the other chapters.

In some embodiments, the outputted translation can be checked for accuracy, using a third-party translation software, the multiple neural network models that were configured differently, or human input. The errors that were found could be incorporated into one or more training sets for respective neural networks to improve their efficacy when translating the next chapter (e.g., which had a score that was substantially similar to the score of the chapter that was currently translated, or alternatively, exceeded a threshold of one or more thresholds).

The described embodiments provide, inter alia, the following features:

Locating unique words, their locations, and then mapping those locations down to each unique meaning provides new capabilities to translate with higher quality results.

Locating and tagging the grammatical type of each word, and then locating and mapping each unique grammatical rule to each matching set of unique meanings with matching order of grammatical word types, thereby providing the capability to ensure the words are placed in such a way to sound natural.

Understanding the locations of the unique meanings, and unique grammatical word type orders on unique meanings, to order the translation review and repair process to perform the least number of corrections, which can then be automatically rolled out to the most amount of additional text, greatly reducing the amount of work needed to review and repair the entire document.

Once the minimal set of repairs are made to rollout repairs to the rest of the document, this, in addition to repairing the entire document, also generates a large enough set of corrections to feed into the training of a predictive neural network. Such changes can later be made automatically, both by detecting where the changes should be made, and by making them.

Changes must be made, and tracked, by type of change and type of input, and a single neural network should be trained for each unique change type/input type pair.

Figure 7:
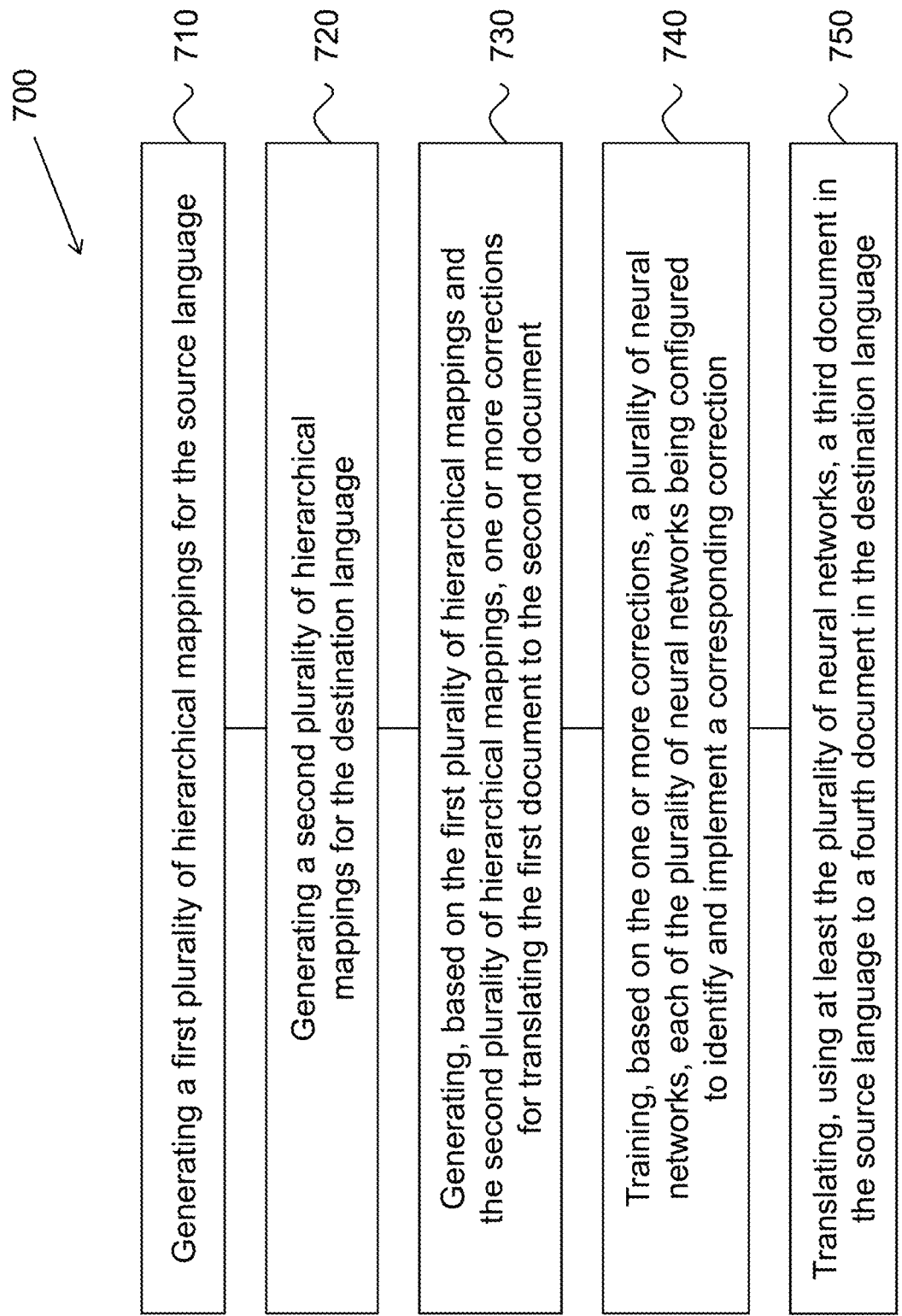
FIG. 7 is a flowchart illustrating another example method for translating a document.

FIG. 7 is a flowchart illustrating an example method 700 for translating a document from a source language to a destination language. The method 700 includes, at operation 710, generating a first plurality of hierarchical mappings for the source language. In some embodiments, each of the first plurality of hierarchical mappings comprises (a) a first mapping between a location of a word of a plurality of words in the source language and a grammatical information associated with the word, and (b) a second mapping between the grammatical information and a grammatical rule of the source language, wherein the grammatical information associated with the word comprises at least a meaning of the word and a grammatical word type of the word (e.g., as shown in FIG. 2A).

In an example, parsing the phrase "red dog" would include generating a first level of mapping, i.e., unique meaning and grammatical word type, that would map "red" to (word 1, "a color at the end of the spectrum next to orange and opposite violet", adjective) and "dog" to (word 2, "a domesticated carnivorous mammal that typically has a long snout, an acute sense of smell, nonretractable claws, and a barking, howling, or whining voice", noun), and then a second level of mapping, i.e., the grammatical rule, that would map to the rule "adjectives are (typically) followed by nouns."

The method 700 includes, at operation 720, generating a second plurality of hierarchical mappings for the destination language. Continuing with the example above, the source language may have the grammatical rule "adjectives are (typically) followed by nouns" (e.g., as in the English language) whereas the second plurality of hierarchical mappings may support the grammatical rule that "an attributive adjective (typically) follows a noun" (e.g., as in French, Spanish or Vietnamese). At least one of the multiple neural networks (e.g., one which was trained to translate attributive adjectives) would be configured to recognize this grammatical conversion rule when the source and destination languages supported these different rules.

The method 700 includes, at operation 730, generating, based on the first plurality of hierarchical mappings and the second plurality of hierarchical mappings, one or more corrections for translating the first document to the second document.

The method 700 includes, at operation 740, training, based on the one or more corrections, a plurality of neural networks, wherein each of the plurality of neural networks is configured to identify and implement a corresponding correction. In the example described above, a neural network would be trained to detect and implement the "adjectives are followed by nouns" rule in any document it processed. As discussed above, using multiple neural networks, each of which is training to detect and implement a single correction (or rule) enables the translation to be implemented with significantly more context than in existing systems.

The method 700 includes, at operation 750, translating, using at least the plurality of neural networks, a third document in the source language to a fourth document in the destination language. In some embodiments, a size of the first and second documents is substantially smaller than a size of the third and fourth documents, respectively. In other embodiments, the first document is a smaller portion of a source document, and the third document is the remaining (larger) portion of the source document. Similarly, the second document is a smaller portion of a destination language document, and the fourth document is the remaining (larger) portion of the destination language document.

In some embodiments, translating the third document is based on a hierarchical structure of the third document. In an example, the hierarchical structure of the third document is based on the third document comprising a number of chapters, and each of the number of chapters comprising a number of verses or paragraphs. Each of the chapters (or other equivalent portion) of the third document can be scored and compared to the scores of chapters of the first document to determine in what order the chapters should be translated in order to minimize the retraining (or weight adjustment) of the neural networks prior to continuing with the translation. The described embodiments advantageously enable the hierarchical structure of a document to be leveraged to improve both the efficiency and efficacy of the translation.

In some embodiments, and as discussed above, when comparing a group of words with matching grammatical word types in the source and destination language, if the rule is different in each language that would be applied against the ordered grammatical word types, then a mapping is needed of how the rule has changed for the destination language is needed. This is an example of a grammatical conversion rule.

In some embodiments, the method 700 further includes (e.g., as described in the context of FIG. 6) the operations of comparing the first document and the third document, generating, based on the comparing, a score indicative of a similarity between the first document and the third document, and determining that the score exceeds a threshold. In an example, the score is based on a distribution of the grammatical word type, an ordering of the grammatical word type, or a percentage of matching unique words and meanings in the first document and the third document.

In some embodiments, the first mapping is based on a topic model and the second mapping is based on a set of grammatical rules associated with the destination language.

In some embodiments, the method 700 further includes the operations of determining that the grammatical rule of the source language is different from the grammatical rule of the destination language, and generating, based on the determining, a grammatical conversion rule between the source language and the destination language.

In some embodiments, at least one neural network of the plurality of neural networks is a persistent recursive neural network (RNN).

In some embodiments, the first plurality of hierarchical mappings is based on the first document and the second plurality of hierarchical mappings is based on the second document. In other embodiments, the second plurality of hierarchical mappings is based on responses to a series of questions asked of a native speaker of the destination language (e.g., the ILAD project).

Figure 8:
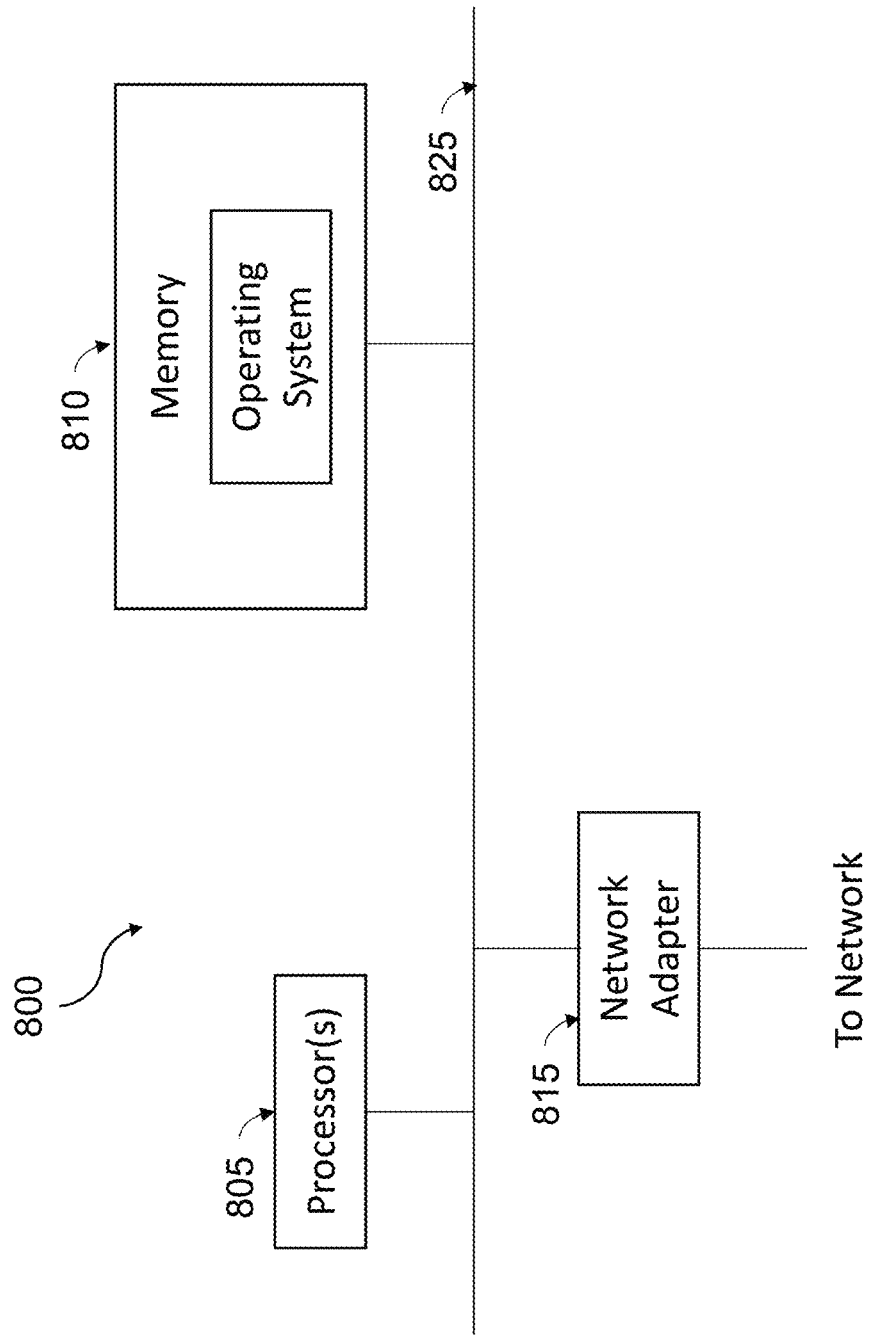
FIG. 8 is a block diagram illustrating an example of a system that can be utilized to implement various portions of the presently disclosed technology.

FIG. 8 is a block diagram illustrating an example of the architecture for a computer system or other control device 800 that can be utilized to implement various methods and portions of the presently disclosed technology. In FIG. 8, the computer system 800 includes one or more processors 805 and memory 810 connected via an interconnect 825. The interconnect 825 may represent any one or more separate physical buses, point to point connections, or both, connected by appropriate bridges, adapters, or controllers. The interconnect 825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 805 may include central processing units (CPUs) to control the overall operation of, for example, the host computer. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 810 can be or include the main memory of the computer system. The memory 810 represents any suitable form of random access memory (RAM), read-only memory (ROM), flash memory, or the like, or a combination of such devices. In use, the memory 810 may contain, among other things, a set of machine instructions which, when executed by processor 805, causes the processor 805 to perform operations to implement embodiments of the presently disclosed technology.

Also connected to the processor(s) 805 through the interconnect 825 is a (optional) network adapter 815. The network adapter 815 provides the computer system 800 with the ability to communicate with remote devices, such as the storage clients, and/or other storage servers, and may be, for example, an Ethernet adapter or Fiber Channel adapter.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for translating a first document in a source language to a second document in a destination language, the method comprising:
generating a first plurality of hierarchical mappings for the source language, wherein each of the first plurality of hierarchical mappings comprises (a) a first mapping between a location of a word in a plurality of words in the source language and a grammatical information associated with the word, and (b) a second mapping between the grammatical information and a grammatical rule of the source language, wherein the grammatical information associated with the word comprises at least a meaning of the word and a grammatical word type of the word;
generating a second plurality of hierarchical mappings for the destination language;
generating, based on the first plurality of hierarchical mappings and the second plurality of hierarchical mappings, one or more corrections for translating the first document to the second document;
training, based on the one or more corrections, a plurality of neural networks, wherein each of the plurality of neural networks is configured to identify and implement a corresponding correction; and
translating, using at least the plurality of neural networks, a third document in the source language to a fourth document in the destination language.

2. The method of claim 1, wherein a size of the first document and the second document is substantially smaller than a size of the third document and the fourth document, respectively.

3. The method of claim 2, comprising:
comparing the first document and the third document;
generating, based on the comparing, a score indicative of a similarity between the first document and the third document; and
determining that the score exceeds a threshold.

4. The method of claim 3, wherein the score is based on a distribution of the grammatical word type, an ordering of the grammatical word type, or a percentage of matching unique words and meanings in the first document and the third document.

5. The method of claim 1, wherein the first mapping is based on a topic model and the second mapping is based on a set of grammatical rules associated with the destination language.

6. The method of claim 1, wherein translating the third document is based on a hierarchical structure of the third document.

7. The method of claim 6, wherein the hierarchical structure of the third document is based on the third document comprising a number of chapters, and each of the number of chapters comprising a number of verses or paragraphs.

8. The method of claim 1, further comprising:
determining that the grammatical rule of the source language is different from the grammatical rule of the destination language; and
generating, based on the determining, a grammatical conversion rule between the source language and the destination language.

9. The method of claim 1, wherein at least one neural network of the plurality of neural networks is a persistent recursive neural network (RNN).

10. The method of claim 1, wherein the first plurality of hierarchical mappings is based on the first document and the second plurality of hierarchical mappings is based on the second document.

11. The method of claim 1, wherein the second plurality of hierarchical mappings is based on responses to a series of questions asked of a native speaker of the destination language.

12. A device for translating a first document in a source language to a second document in a destination language, the device comprising:
at least one processor; and
a non-transitory including processor executable code, wherein the processor executable code upon execution by the at least one processor causes the at least one processor to:
generate a first plurality of hierarchical mappings for the source language, wherein each of the first plurality of hierarchical mappings comprises (a) a first mapping between a location of a word in a plurality of words in the source language and a grammatical information associated with the word, and (b) a second mapping between the grammatical information and a grammatical rule of the source language, wherein the grammatical information associated with the word comprises at least a meaning of the word and a grammatical word type of the word;
generate a second plurality of hierarchical mappings for the destination language;
generate, based on the first plurality of hierarchical mappings and the second plurality of hierarchical mappings, one or more corrections for translating the first document to the second document;
train, based on the one or more corrections, a plurality of neural networks, wherein each of the plurality of neural networks is configured to identify and implement a corresponding correction; and
translate, using at least the plurality of neural networks, a third document in the source language to a fourth document in the destination language.

13. The device of claim 12, wherein a size of the first document and the second document is substantially smaller than a size of the third document and the fourth document, respectively.

14. The device of claim 13, comprising:
comparing the first document and the third document;
generating, based on the comparing, a score indicative of a similarity between the first document and the third document; and
determining that the score exceeds a threshold.

15. The device of claim 14, wherein the score is based on a distribution of the grammatical word type, an ordering of the grammatical word type, or a percentage of matching unique words and meanings in the first document and the third document.

16. The device of claim 12, wherein translating the third document is based on a hierarchical structure of the third document.

17. The device of claim 16, wherein the hierarchical structure of the third document is based on the third document comprising a number of chapters, and each of the number of chapters comprising a number of verses or paragraphs.

18. The device of claim 12, further comprising:
determining that the grammatical rule of the source language is different from the grammatical rule of the destination language; and
generating, based on the determining, a grammatical conversion rule between the source language and the destination language.

19. The device of claim 12, wherein the first plurality of hierarchical mappings is based on the first document, and wherein the second plurality of hierarchical mappings is based on the second document or responses to a series of questions asked of a native speaker of the destination language.

20. A non-transitory computer-readable storage medium having instructions stored thereupon for translating a first document in a source language to a second document in a destination language, comprising:
instructions for generating a first plurality of hierarchical mappings for the source language, wherein each of the first plurality of hierarchical mappings comprises (a) a first mapping between a location of a word in a plurality of words in the source language and a grammatical information associated with the word, and (b) a second mapping between the grammatical information and a grammatical rule of the source language, wherein the grammatical information associated with the word comprises at least a meaning of the word and a grammatical word type of the word;
instructions for generating a second plurality of hierarchical mappings for the destination language;
instructions for generating, based on the first plurality of hierarchical mappings and the second plurality of hierarchical mappings, one or more corrections for translating the first document to the second document;
instructions for training, based on the one or more corrections, a plurality of neural networks, wherein each of the plurality of neural networks is configured to identify and implement a corresponding correction; and
instructions for translating, using at least the plurality of neural networks, a third document in the source language to a fourth document in the destination language.

* * * * *